(12) United States Patent
Ter-Hovhannisian

(10) Patent No.: US 6,533,438 B2
(45) Date of Patent: Mar. 18, 2003

(54) BICYCLE OR SCOOTER SAFETY LIGHT

(75) Inventor: Artak Ter-Hovhannisian, Burbank, CA (US)

(73) Assignee: U.S. Britelite, Inc., Burbank, CA (US)

( * ) Notice: Subject to any disclaimer, the term of this patent is extended or adjusted under 35 U.S.C. 154(b) by 0 days.

(21) Appl. No.: 09/898,842

(22) Filed: Jul. 3, 2001

(65) Prior Publication Data

US 2003/0007352 A1 Jan. 9, 2003

(51) Int. Cl.$^7$ .......................... H01R 13/44; F21V 33/00
(52) U.S. Cl. ...................... 362/276; 362/473; 362/549; 362/545; 362/542; 340/432
(58) Field of Search .............................. 362/802, 473, 362/276, 542, 549, 543, 368, 479, 545; 340/432

(56) References Cited

U.S. PATENT DOCUMENTS 5,803,574 A * 9/1998 Szaniszlo .................... 362/473
5,856,727 A * 1/1999 Schroeder et al. ............ 315/55

\* cited by examiner

*Primary Examiner*—Alan Cariaso
*Assistant Examiner*—Ali Alavi
(74) *Attorney, Agent, or Firm*—Kelly Bauersfeld; Lowry & Kelley, LLP

(57) ABSTRACT

A bicycle of scooter safety light mountable to the scooter or bicycle, includes light emitting diodes conductively coupled with a battery-operated power circuit. A plurality of elongated segments are pivotally attached to one another and form a generally cylindrical housing structure sized to wrap tightly around a bar of the bicycle or scooter when opposing segments are brought towards one another and clamped together. Internal compartments of the segments hold either the power circuit and battery or light emitting diodes. The safety light includes a power switch, such as a motion detector for controlling illumination of light emitting diode only when motion is detected, or a photo sensor for delivering power to the light emitting diodes only when in absence of light is detected in order to conserve battery power.

22 Claims, 3 Drawing Sheets

BICYCLE OR SCOOTER SAFETY LIGHT

BACKGROUND OF THE INVENTION

The present invention generally relates to bicycles and scooters. More particularly, the present invention relates to a safety light that can be removably mounted onto a bicycle or foot scooter.

There exists millions of bicycles and foot scooters in the United States, and worldwide. In fact, it is estimated that there are over 20 million scooters in the United States alone, and 75 million worldwide. Bicycles and foot scooters serve as a means for transportation, as well as enjoyment, particularly for young children. A recent survey indicates that approximately ten thousand children are injured every day for various reasons. Some of these injuries are related to accidents involving bicycles and foot scooters. Serious injury, or even death, can result when a child riding a bicycle or foot scooter is struck by a car.

Nearly all bicycles include reflectors which alert a driver at night of the presence of the bicycle when the headlights are shown onto the reflector. However, the use of reflectors is somewhat limited as the automobile and bicycle must be fairly close to one another and the headlights directed onto to the reflector before the driver of the automobile will see the bicyclist.

This drawback has been known for quite some time, thus lights have been incorporated into some bicycles. These lights are typically mounted either onto the handlebars or rear seat post of the bicycle. Typically, such lights are attached using mounting assemblies, screws, and complex clamps so that the light becomes a nearly permanent fixture to the bicycle. Such assembly requires the use of tools and the aid of an adult. Another disadvantage of such lights is that unless lights are attached to all four sides of the bicycle, a driver approaching the bicycle may not be able to view the light. For example, a light attached to the seat post and directed towards the rear of the bicycle will enable drivers approaching from the rear to easily see the bicycle within a certain distance. However, a driver approaching from the front of the bicycle will be unable to see the rearwardly directed light. Yet another problem with such lights is that they are typically comprised of an incandescent lamp that requires a significant amount of power and is subject to breakage due to the shocks and jolts experienced during the riding of the bicycle. Thus, these lamps must be periodically replaced. The normal life span of such lights is also fairly limited, even absent such shocks and jolts.

Foot scooters, which are typically smaller than bicycles, have traditionally been devoid of such reflectors and lights, increasing the risk of injury, particularly at night.

Accordingly, there is a need for a safety light which can be mounted onto a bicycle or scooter. Such safety light should be easily attachable, even by children without the need for tools. The safety light should be resistant to breakage, have a long life, and consume very little power. However, such a safety light should be easily seen from all angles of the bicycle or scooter from a great distance. The present invention fulfills these needs and provides other related advantages.

SUMMARY OF THE INVENTION

The present invention resides in a bicycle or scooter safety light generally comprising a housing mountable to a portion of the scooter or bicycle, such as a handlebar or front vertical post. A power circuit is associated with the housing that includes a battery and a power switch. A light emitting diode, preferably a plurality of light emitting diodes, are conductively coupled with the power circuit. A clamp is associated with the housing for removably attaching the housing to the bicycle or scooter.

The power switch preferably comprises a motion detector associated with the power circuit for controlling illumination of the light emitting diodes only when motion is detected. Alternatively, or additionally, the power switch may include a photo sensor so that power is delivered to the light emitting diodes only when an absence of light is detected. The motion detector and/or photo sensor result in the light emitting diodes being only illuminated when motion is detected or there is a low level of light, thus conserving battery power and reducing the need to replace the batteries.

The housing comprises a plurality of elongated segments pivotally attached to one another so as to form a generally cylindrical structure capable of being tightly wrapped around a bar of the bicycle or scooter when opposing end segments are brought towards one another. The clamp includes a tab extending from an end segment of the housing, and a latch extending from an opposite end segment of the housing which securely receives the tab therein. The tab preferably includes a plurality of ridges extending from an upper surface thereof which frictionally engage a protrusion extending into a notch of the latch so that the tab is secured within the latch and can be selectively tightened or released.

Each segment of the housing defines an internal compartment configured to hold either the power circuit and battery, or light emitting diodes. The segment having the compartment holding the battery includes a removable backing for accessing the battery for replacement purposes. Typically, each segment includes an arcuate base having an elongated and enclosed wall extending therefrom and defining the compartment. Upon bringing the opposing end segments together, the bases of the segments define a central aperture sized to accept a bar of the bicycle or scooter therein.

There are no tools necessary for mounting the safety light onto the bicycle or scooter, and the clamping mechanism is simple enough to operate that a child can mount the safety light without adult supervision. The use of light emitting diodes allows extended battery life as the light emitting diodes require very little power. However, the light emitting diodes are visible for a great distance, often over a mile away. The light emitting diodes can emit red light, to act as a warning, without the need for a colored lens.

Other features and advantages of the present invention will become apparent from the following more detailed description, taken in conjunction with the accompanying drawings, which illustrate, by way of example, the principles of the invention.

DETAILED DESCRIPTION OF THE DRAWINGS

The accompanying drawings illustrate the invention. In such drawings.

DETAILED DESCRIPTION OF THE PREFERRED EMBODIMENTS

Figure 1:
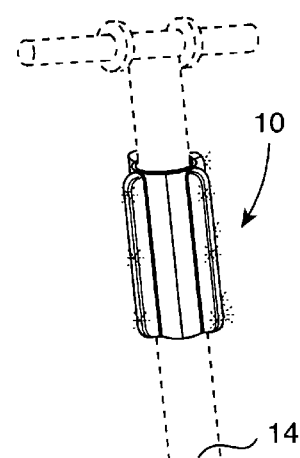
FIG. 1 is a perspective view of a safety light embodying the present invention attached to a foot scooter, illustrated in phantom.

As shown in the drawings for purposes of illustration, the present invention is concerned with a safety light, generally referred to in the figures by the reference number 10, which is removably mountable to a bicycle or scooter 12. The safety light 10 is shown attached to a vertical handlebar 14 of the scooter 12, although it is to be understood that the safety light 10 may be attached to other portions of the scooter 12, or a bicycle (not shown).

Figure 2:
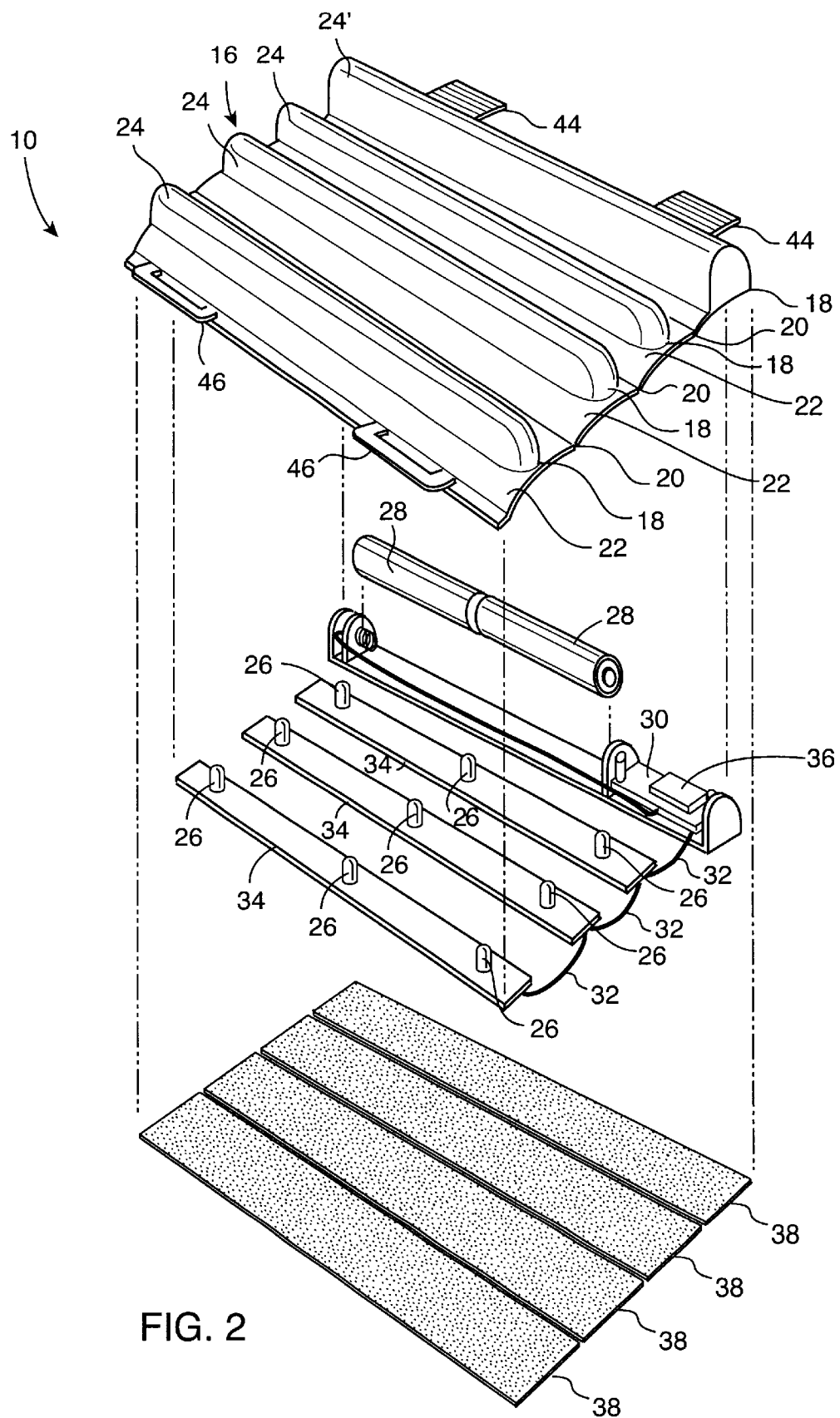
FIG. 2 is an exploded perspective view of the safety light of the present invention illustrating the various components thereof.

Referring now to FIG. 2, an exploded perspective view of the safety light 10 is shown. The safety light 10 includes a housing 16 typically comprised of transparent or translucent plastic material, or the like. The housing 16 includes a plurality of elongated segments 18 connected to one another along their lengths so as to allow the segments 18 to hinge and pivot about their respective connections 20. Each segment 18 includes an arcuate base 22 and an elongated and enclosed wall defining an internal compartment 24. The internal compartments 24 are configured to either hold light emitting diodes 26, or batteries 28 and a power circuit 30.

The batteries 28 typically comprise "AA" batteries, or other appropriate dry cell batteries which are conductively coupled to the power circuit 30 for powering the multiple light emitting diodes 26. Electrical leads 32 interconnect circuit board or conductive strips 34 bearing the light emitting diodes 26 which are inserted into the various compartments 24 and spaced from one another to provide a broad range of illumination, as will be more fully described herein.

The power circuitry 30 typically includes a power switch 36 for selectively powering the light emitting diodes 26 in order to conserve energy. Preferably, such switch 36 comprises a motion detector for controlling the illumination of the light emitting diodes 26 only when is of the safety light 10 is detected. Thus, the light emitting diodes 26 are only illuminated, and power taken from the batteries 28, when the safety light 10 is actually in use. This serves to greatly conserve power, while serving the purposes of the safety light 10. Alternatively, or in addition, the switch 36 can include a photo sensor so that power is delivered to the light emitting diodes 26 only when an absence of light, such as at night, is detected. However, it has been found that children find the safety light 10 to be not only a source of warning and protection, but also an entertaining novelty device. Thus, the use of the motion detector switch 36 is preferred as the safety light 10 will illuminate even during daylight hours as the scooter 12 or bicycle is ridden to the delight of children.

The housing 16 itself can be provided in a number of appealing colors. A liner 38 is used to seal either the light emitting diodes 26, or batteries 28 and power circuitry 30 within the compartments 24 of the housing segments 18. The liners 38 are preferably comprised of a cushion material so as not to mar or scratch the finish or surface of the scooter 12 or bicycle.

Figure 3:
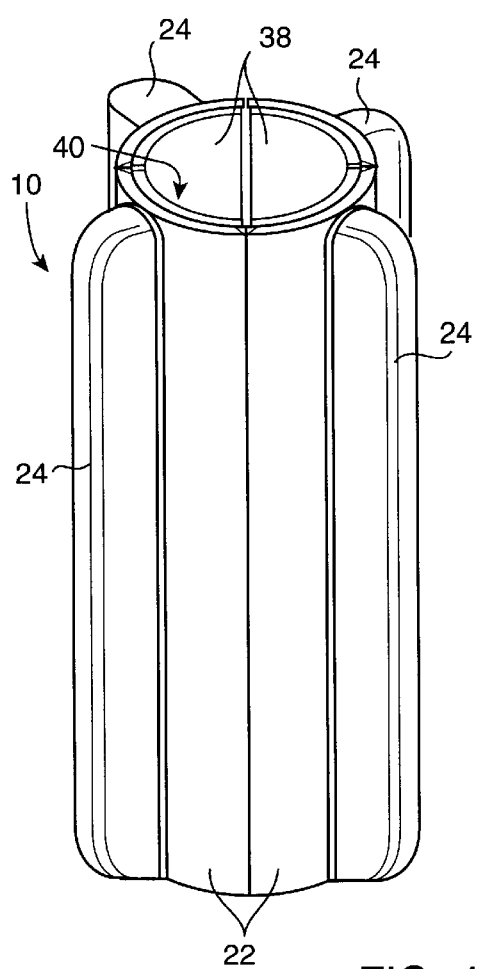
FIG. 3 is a perspective view of the safety light in a closed state.
Figure 4:
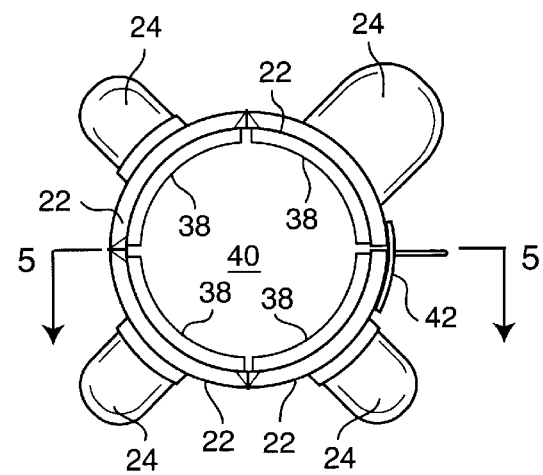
FIG. 4 is a top plan view of the closed safety light.
Figure 5:
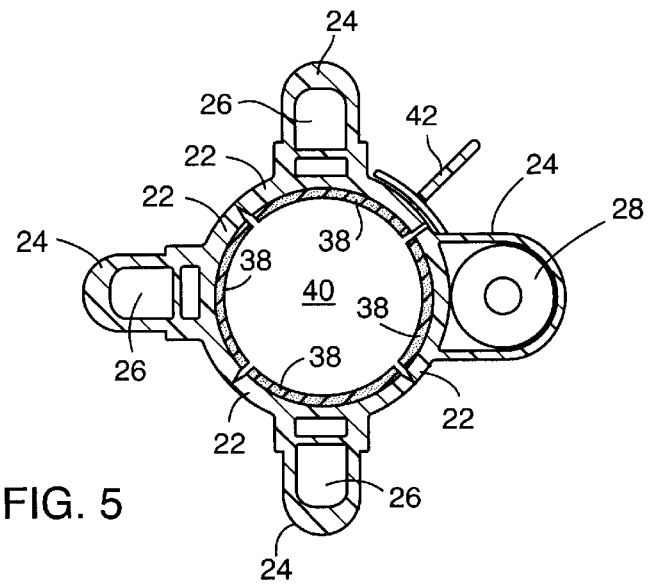
FIG. 5 is cross-sectional view taken generally along the line 5—5 of FIG. 4.

With reference now to FIGS. 3–5, the end segments 18 of the housing 16 can be brought towards one another to create a generally cylindrical structure, as illustrated in FIG. 3. Due to the curved nature of the bases 22, a generally cylindrical aperture 40 is formed when the segments 18 are brought towards one another. This aperture 40 is sized so as to fit over the predetermined bar of the bicycle or scooter 12, such as the vertical handlebar 14 illustrated in FIG. 1. Such attachment and cylindrical configuration permit light to be emitted from nearly a 360° angle.

Figure 6:
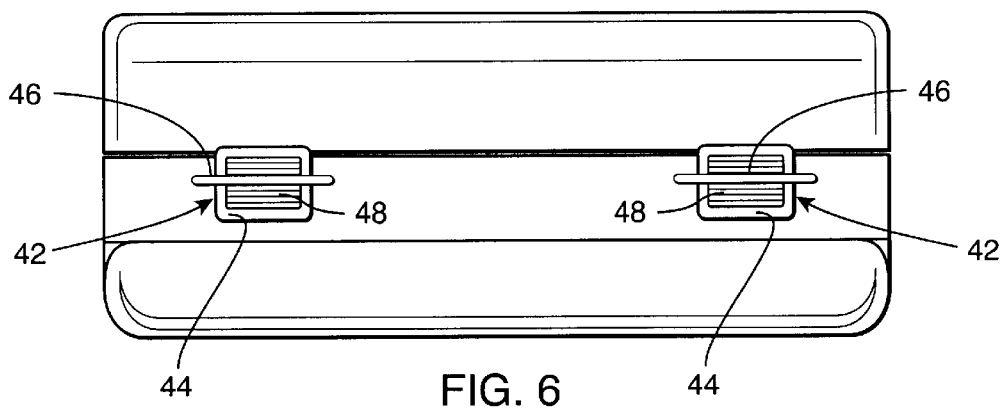
FIG. 6 is a side elevational view of the safety light in a closed and clamped state.
Figure 7:
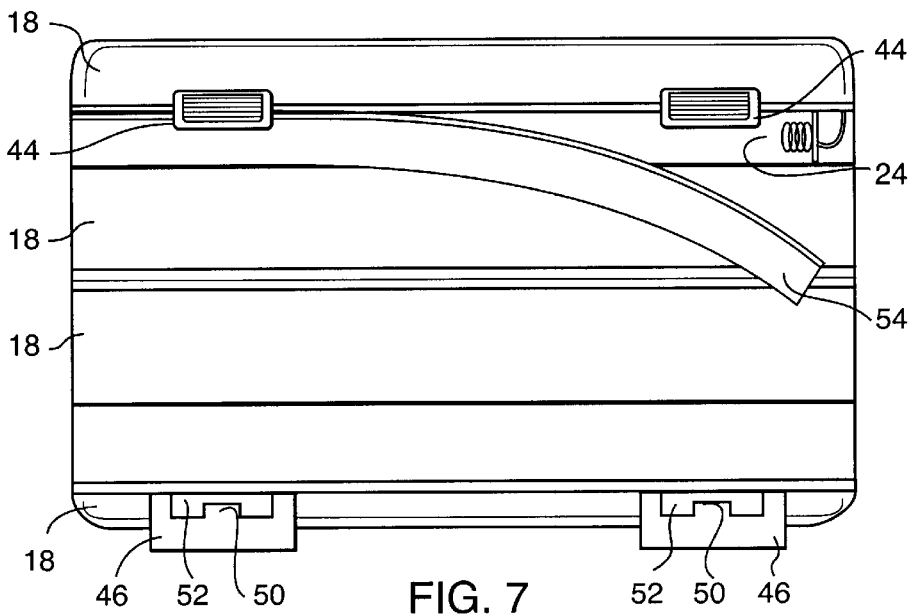
FIG. 7 is a side elevational view of the safety partially open, and having a backing partially removed to expose a battery compartment thereof.

A clamp 42 is used to secure the end segments 18 together to hold the safety light 10 onto the bar of the bicycle or scooter 12. Preferably, the clamp 42 can be adjusted somewhat to fit bars of different widths. With reference now to FIGS. 6 and 7, the clamps 42 comprise a tab 44 extending from one end segment, and a latch 46 extending from the opposite end segment, such that the tab can be secured within the latch upon bringing the end segments 18 together. Typically, the tab 44 includes a series of ridges 48 extending upwardly from a top surface of the tab 44 which engage a protrusion 50 extending into a notch 52 of the latch 46, in order to frictionally hold the tab 44 therein. Increasingly bringing the end segments 18 towards one another results in the ridges 48 being sequentially forced through the notch 52. Thus, the width of the aperture 40 of the safety light 10 can be adjusted according to the length of the tab 44 and number of ridges 48 thereon. This configuration also enables the safety light 10 to be removed by pulling apart the end segments 18 to force the tab 44 out of the central notch 52 of the latch 46.

FIG. 7 shows the safety light 10 partially opened. This may be necessary in order remove the safety light 10 from one scooter 12 or bicycle, to another. Also, although the batteries 28 can last up to 560 hours or more given the switch 36 and low power consumption of the light emitting diodes 26, it may still be necessary to periodically replace the batteries 28. In such instance, the safety light 10 is open as described above, and a backing 54 covering the battery compartment 24' is peeled away to expose the batteries and battery compartment 24'. The used batteries 28 can be removed, and fresh batteries 28 inserted for continued used of the safety light 10. Such backing 54 typically comprises a strip of plastic which is secured at one end thereof to the housing 16 and which can be snapped into the compartment 24' of the battery-containing segment 18. Although other designs are feasible, the use of the peel-away backing 54 eliminates the need for screwdrivers or other tools. In fact, it will be noted by the reader that the safety light 10 does not require any tools to be mounted, or removed, from the bicycle or scooter 12. Thus, children do not need adult supervision in order to mount the safety light 10 onto their bicycles and scooters 12.

The present invention is advantageous over other prior art safety lights in that it has a very low power consumption, while the light emitting diodes 26 are visible at a very great distance, often a mile or more. The cylindrical configuration of the closed safety light 10 enables drives to see the illuminated safety light 10 from any angle of the bicycle or scooter 12. The safety light 10 can be manufactured using red light emitting diodes 26 to act as a warning without the need of a red lens or the like. The safety light 10 is self-contained, unobtrusive to the rider of the bicycle or scooter 12, and requires only periodic attention once mounted.

Although several embodiments have been described in some detail for purposes of illustration, various modifications may be made without departing from the scope and spirit of the invention. Accordingly, the invention is not to be limited, except as by the appended claims.

What is claimed is:

1. A bicycle or scooter safety light, comprising:
a housing mountable to a portion of the scooter or bicycle;
a power circuit associated with the housing;
a light emitting diode conductively coupled with the power circuit; and
a motion detector associated with the power circuit for controlling illumination of the light emitting diode only when motion is detected;
wherein the power circuit includes a battery disposed within the housing and wherein the light emitting diode comprises a plurality of light emitting diodes disposed within the housing and spaced from one another; and
wherein the housing comprises a plurality of elongated segments pivotally attached to one another so as to form a generally cylindrical structure sized to wrap tightly around a bar of the bicycle or scooter when opposing end segments are brought towards one another.

2. The safety light of claim 1, including a clamp associated with the housing for removably attaching the housing to the bicycle or scooter.

3. The safety light of claim 2, wherein the clamp comprises a tab extending from an end segment of the housing and a latch extending from an opposite end segment of the housing for securely receiving the tab therein.

4. The safety light of claim 3, wherein the tab includes a plurality of ridges extending from an upper surface thereof which frictionally engage a protrusion extending into a notch of the latch.

5. The safety light of claim 1, wherein each segment defines an internal compartment configured to hold either the power circuit and battery or light emitting diodes.

6. The safety light of claim 5, wherein each segment includes an arcuate base having an elongated and enclosed wall extending therefrom and defining the compartment, whereby upon bringing the opposing end segments together, the bases of the segments define a central aperture sized to accept a bar of the bicycle or scooter therein.

7. The safety light of claim 5, wherein the segment having the compartment holding the battery includes a removable backing for accessing the battery.

8. The safety light of claim 1, wherein the power circuit includes a photosensor so that power is delivered to the light emitting diode only when an absence of light is detected.

9. The safety light of claim 1, including a power switch associated with the housing for selectively powering the motion detector and light emitting diode.

10. A bicycle or scooter safety light, comprising:
a housing including a plurality of elongated segments pivotally attached to one another so as to form a generally cylindrical structure sized to wrap tightly around a bar of the bicycle or scooter when opposing end segments are brought towards one another;
a clamp associated with the housing for removably attaching the housing to the bicycle or scooter;
a power circuit including a battery disposed within the housing;
a plurality of light emitting diodes conductively coupled with the power circuit and spaced from one another within the housing; and
a power switch associated with the housing for selectively illuminating the light emitting diodes.

11. The safety light of claim 10, wherein each segment defines an internal compartment configured to hold either the power circuit and battery or light emitting diodes.

12. The safety light of claim 11, wherein each segment includes an arcuate base having an elongated and enclosed wall extending therefrom and defining the compartment, whereby upon bringing the opposing end segments together, the bases of the segments define a central aperture sized to accept a bar of the bicycle or scooter therein.

13. The safety light of claim 11, wherein the segment having the compartment holding the battery includes a removable backing for accessing the battery.

14. The safety light of claim 10, wherein the clamp comprises a tab extending from an end segment of the housing and a latch extending from an opposite end segment of the housing for securely receiving the tab therein.

15. The safety light of claim 14, wherein the tab includes a plurality of ridges extending from an upper surface thereof which frictionally engage a protrusion extending into a notch of the latch.

16. The safety light of claim 10, wherein the power switch comprises a motion detector associated with the power circuit for controlling illumination of the light emitting diodes only when motion is detected.

17. The safety light of claim 10, wherein the power switch comprises a photosensor so that power is delivered to the light emitting diodes only when an absence of light is detected.

18. A bicycle or scooter safety light, comprising:
a housing including a plurality of elongated segments pivotally attached to one another so as to form a generally cylindrical structure sized to wrap tightly around a bar of the bicycle or scooter when opposing end segments are brought towards one another;
a clamp associated with the housing for removably attaching the housing to the bicycle or scooter, the clamp comprising a tab extending from an end segment of the housing and a latch extending from an opposite end segment of the housing for securely receiving the tab therein;
a power circuit including a battery disposed within the housing;
a plurality of light emitting diodes conductively coupled with the power circuit and spaced from one another within the housing; and
a motion detector associated with the power circuit for controlling illumination of the light emitting diodes only when motion is detected;
wherein each segment defines an internal compartment configured to hold either the power circuit and battery or light emitting diodes.

19. The safety light of claim 18, wherein each segment includes an arcuate base having an elongated and enclosed wall extending therefrom and defining the compartment, whereby upon bringing the opposing end segments together, the bases of the segments define a central aperture sized to accept a bar of the bicycle or scooter therein.

20. The safety light of claim 18, wherein the segment having the compartment holding the battery includes a removable backing for accessing the battery.

21. The safety light of claim 18, wherein the tab includes a plurality of ridges extending from an upper surface thereof which frictionally engage a protrusion extending into a notch of the latch.

22. The safety light of claim 18, including a photosensor associated with the power circuit so that power is delivered to the light emitting diodes only when an absence of light is detected.

* * * * *